(12) United States Patent
Buxbaum

(10) Patent No.: US 7,267,804 B2
(45) Date of Patent: Sep. 11, 2007

(54) MEMBRANE REACTOR FOR GAS EXTRACTION

(76) Inventor: Robert E. Buxbaum, 25451 Gardner, Oak Park, MI (US) 48237

( * ) Notice: Subject to any disclaimer, the term of this patent is extended or adjusted under 35 U.S.C. 154(b) by 797 days.

(21) Appl. No.: 10/085,193

(22) Filed: Feb. 27, 2002

(65) Prior Publication Data

US 2002/0187089 A1 Dec. 12, 2002

Related U.S. Application Data

(63) Continuation-in-part of application No. 09/901,398, filed on Jul. 9, 2001, now Pat. No. 6,923,944.

(60) Provisional application No. 60/338,737, filed on Dec. 5, 2001, provisional application No. 60/271,883, filed on Feb. 27, 2001, provisional application No. 60/216,561, filed on Jul. 7, 2000.

(51) Int. Cl.
*B01J 8/02* (2006.01)

(52) U.S. Cl. ............ 422/168; 422/211; 422/198; 422/222; 48/127.9

(58) Field of Classification Search ............... 422/168, 422/196, 197; 95/53–56; 96/4, 11; 429/17
See application file for complete search history.

(56) References Cited

U.S. PATENT DOCUMENTS

| | | | |
|---|---|---|---|
| 4,810,485 A | 3/1989 | Marianowski et al. ... | 423/648.1 |
| 5,226,932 A * | 7/1993 | Prasad ............................ | 95/45 |
| 5,658,681 A * | 8/1997 | Sato et al. ..................... | 429/13 |
| 5,888,272 A * | 3/1999 | Prasad et al. .................. | 95/54 |
| 5,888,273 A | 3/1999 | Buxbaum ....................... | 95/56 |
| 5,931,987 A | 8/1999 | Buxbaum ....................... | 95/55 |
| 5,938,800 A * | 8/1999 | Verrill et al. ............... | 48/127.9 |
| 6,063,515 A * | 5/2000 | Epp et al. ...................... | 429/17 |
| 6,106,591 A * | 8/2000 | Keskar et al. .................. | 95/54 |
| 6,348,278 B1 * | 2/2002 | LaPierre et al. .............. | 429/17 |
| 6,383,670 B1 * | 5/2002 | Edlund et al. ................ | 429/20 |
| 6,896,709 B1 * | 5/2005 | Han et al. ................... | 48/127.9 |
| 6,923,944 B2 * | 8/2005 | Buxbaum .................... | 422/211 |

* cited by examiner

*Primary Examiner*—Glenn Caldarola
*Assistant Examiner*—Tom Duong
(74) *Attorney, Agent, or Firm*—Gifford, Krass, Sprinkle, Anderson & Citkowski, P.C.

(57) ABSTRACT

The membrane reactor of the present invention generates a desired gas such as hydrogen produced by steam reforming liquid fuels. The membrane reactor provides thermal integration between the heating source and the reaction catalyst by heat conduction through a solid medium. A gas purification system extracts energy from the waste gases to heat the membrane reactor. This, in concert with other control mechanisms provided results in a more efficient gas purification process.

20 Claims, 3 Drawing Sheets

MEMBRANE REACTOR FOR GAS EXTRACTION

RELATED APPLICATIONS

This patent application is a continuation-in-part of patent application Ser. No. 09/901,398 filed Jul. 9, 2001 now U.S. Pat. No. 6,923,944, which claims priority of provisional patent application Ser. No. 60/216,561 filed Jul. 7, 2000. This application also claims priority of provisional patent applications Ser. No. 60/271,883 filed Feb. 27, 2001 and Ser. No. 60/338,737 filed Dec. 5, 2001.

FIELD OF THE INVENTION

The present invention relates to an apparatus for the generation of a gas and the separation and purification of the generated gas from a mixed gas flow; and, more particularly, the generation of hydrogen by steam reforming liquid fuel and the purification of hydrogen from a mixture of gases using a hydrogen selective membrane.

BACKGROUND OF THE INVENTION

One of the main problems with the use of a conventional reactor to convert liquid and hydrocarbon fuels to hydrogen for use in fuel cells or for industrial applications is that the hydrogen is produced as an impure mixture. A purifier, either using membranes or pressure swing absorption often is used in-line after the reactor, but a better solution for many applications is a membrane reactor, a device that combines a hydrogen generating reactor and a hydrogen extracting membrane. Membrane reactors combine in one vessel a reaction, that often is catalyzed with a membrane that extracts a product or introduces a reactant. Such reactors have advantages over conventional reactors especially for applications like converting liquid hydrocarbon fuels to hydrogen for use in fuel cells or for chemical applications. R. E. Buxbaum, *Journal of Separation Science*, 1999. With a suitable membrane, a membrane reactor produces ultra-pure hydrogen and allows the endothermic forming reaction to go forward at higher pressures and lower temperatures than would be feasible otherwise. Membrane reactors of this type are illustratively described in U.S. Pat. Nos. 4,810,485; 5,888,273; 6,183,543 and 5,931,987.

In membrane reactors such as those identified above, an appropriate feedstock material such as methane-water, methanol-water or ammonia is heated to boiling outside of the reactor and reacted in the presence of a reaction catalyst. Hydrogen as well as undesirable gases are produced, but only the hydrogen is extracted through the membranes.

In these prior art reactors the catalyst is distributed within the reactor housing such that catalyst is in contact with a membrane making horizontal orientation of the reactor apparatus difficult because reaction catalyst displacement causes lower efficiency gas collection.

The hydrogen output of the reactor is determined in large part by heat transfer to the reaction catalyst and to a much lesser extent by permeation in the membrane or specific activity in the reaction catalyst. Heat transfer is increased temporarily by using higher temperature heating gases, for example, and reaction rates rise as expected, but this solution often harms the reaction catalyst and can reduce the overall thermal efficiency as well. Thus, there exists a need for a membrane reactor that achieves better thermal integration between a heat source and a reaction catalyst.

Another problem typically encountered with these reactions is in finding an efficient method to compress the feed to the reactor and exhaust a bleed stream of desired gas from the fuel cell. This is important especially with small reactors that feed hydrogen to small mobile fuel cells. The pump that compresses the feed uses a large amount of electric energy, thereby reducing the efficiency of the overall system. Also, most fuel cells are constrained to run with hydrogen above atmospheric pressure as there is currently no convenient way to exhaust impurities that enter the hydrogen by diffusion through the fuel cell membrane. Thus, there exists a need for a reactor having efficient mechanisms to compress the feed, exhaust the fuel cell, or both.

SUMMARY OF THE INVENTION

A gas purification system includes a reactor having a wall with both interior and exterior sides and a communicating portal therebetween for a mixed gas flow. The system includes a heat conduit within the reactor volume. The heat conduit has a wall having an interior side in contact with a heated material and an exterior side facing a gas selective membrane. A reaction catalyst coating is in contact with the exterior side of the conduit wall. A gas selective membrane resides within the reactor volume in contact with the mixed gas flow and selectively passes a constituent gas of the mixed gas flow therethrough with a raffinate of the mixed gas flow retained in contact with the membrane. An outlet channel for removing the raffinate from contact with the membrane is provided, and a passageway for the removal of the constituent gas from the interior of said reactor is also provided. The gas purification system optionally includes any of a combustion catalyst, preferably in contact with the interior side of the conduit wall, a flow distributor and a heat transfer element.

A fuel cell system is also provided herein. An inventive fuel cell system includes a reactor having a volume and a wall, the wall has an interior side and an exterior side and a communicating portal therebetween for a mixed gas flow. A gas selective membrane within the reactor volume is in contact with the mixed gas flow and selectively passes a constituent gas of the mixed gas flow therethrough whereby a raffinate of the mixed gas flow is retained in contact with the membrane. An outlet channel is provided for removing the raffinate from contact with the membrane. A raffinate compressor is disposed in a raffinate removal channel. A passageway for removal of the constituent gas from the interior of the reactor is also provided. Optionally, the raffinate compressor is a venturi. In a further option, the fuel cell system includes a fuel cell powered by the constituent gas.

In another embodiment of a gas purification system provided herein an inventive system includes a reactor having a volume and a wall, the wall has an interior side and an exterior side and a communicating portal therebetween for a mixed gas flow. A feed conduit is provided for delivering the mixed gas flow. The feed conduit is in contact with the communicating portal so as to deliver the mixed gas to the inside of the reactor. A gas selective membrane within the reactor volume is in contact with the mixed gas flow and selectively passes a constituent gas of the mixed gas flow therethrough whereby a raffinate of the mixed gas flow is retained in contact with the membrane. An outlet channel is provided for removing the raffinate from contact with the membrane. The passageway for the removal of the constituent gas is in thermal contact with the feed conduit. A passageway for removal of the constituent gas from the interior of the reactor is also provided. Optionally the passageway for the removal of the constituent gas is brazed to the feed conduit.

In a further embodiment of a gas purification system an inventive system includes a reactor having a volume and a wall, the wall has an interior side and an exterior side and a communicating portal therebetween for a mixed gas flow. A gas selective membrane within the reactor volume is in contact with the mixed gas flow and selectively passes a constituent gas of the mixed gas flow therethrough whereby a raffinate of the mixed gas flow is retained in contact with the membrane. An outlet channel is provided for removing the raffinate from contact with the membrane. A passageway for removal of the constituent gas from the interior of the reactor is also provided. The system optionally includes any of the following: a raffinate burner, a feed pump, a feed pump controller, a feed:water ratio controller, a raffinate compressor, a back pressure regulator, a needle valve, a raffinate:air mix controller and an oxygen sensor.

In another embodiment of a gas purification system an inventive system includes a reactor that optionally includes multiple reaction catalysts within the reaction volume. In a further option, the reaction catalysts are differentially distributed within the reaction volume along a temperature gradient.

DETAILED DESCRIPTION OF THE INVENTION

Thermal integration of a heat source and a reaction catalyst is achieved by providing an apparatus to allow heat to transfer through a solid component to the reaction catalyst. The reaction catalyst is coated on the interior of the reactor body and/or on the interior of a feed tube. A coated feed tube functions as a pre-reactor. Optionally the feed tube is coiled. Further thermal integration is achieved by coating a combustion catalyst on an exterior surface of the reactor and/or feed tube ceramic support.

A reaction taking place in the reactor of the present invention illustratively includes a cracking reaction and an aromatization reaction. The reactor includes a membrane selective for specific materials, such as a desired gas. For example, where the reactor generates hydrogen, a hydrogen selective membrane is included. A hydrogen selective membrane includes a hydrogen selective material such as palladium-coated refractory metals, or alloys of refractory metals, polymers, palladium-silver, palladium-copper, porous metals, silica and ceramics.

In another embodiment of the present invention, the desired gas generated by the reactor is a synthetic gas where an oxygen-containing gas mixture, such as air, contacts the oxygen selective membrane causing oxygen ions to diffuse through the membrane. A mixed gas containing a low molecular weight hydrocarbon, such as methane, is brought into contact with the oxygen to form synthesis gas and higher hydrocarbons. Catalysts for conversion of hydrocarbons to synthesis gas and membranes selective for oxygen are well known in the art as illustratively detailed in Nataraj et al., U.S. Pat. No. 6,214,066.

A membrane included in the reactor of the present invention is preferably tubular and has a diameter ranging from 0.02 to 0.25 inches. One or more membranes are included in the reactor.

Reaction Catalyst Coating

Figure 1:
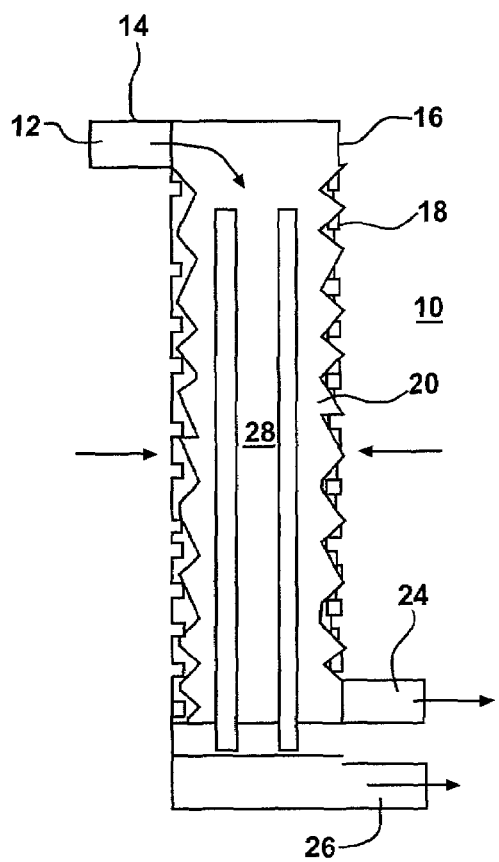
FIG. 1 is a schematic-cross sectional view of a membrane reactor apparatus including a reaction catalyst coated on the external wall of the reactor according to the present invention.

Heat transfer by gas phase thermal conduction is less efficient than solid state thermal conduction. In a preferred embodiment, the present invention provides solid state thermal conduction in a gas generating membrane reactor where the reaction catalyst 28 is coated on the interior side of the wall of a reactor, shown generally at 10 in FIG. 1. A feed tube for mixed gases having a wall with an interior side 12 and an exterior side 14 conducts gases into the reactor 10. The reactor has a wall having an exterior side 16 and an interior side 18 coated with reaction catalyst. A tube 20 has a selective membrane allows the passage of a desired gas through a purified gas outlet 26 for collection. Raffinate gas exits through a passage 24.

Suitable reaction catalysts include but are not limited to promoted nickel on alumina, nickel, copper-zinc oxide (G-66), and a mixture thereof. A high level of gas production, such as hydrogen production, is observed with a mixture of catalysts. In this arrangement, a high temperature catalyst remains stable in the higher temperature reactor zones, while a low temperature catalyst maintains activity in the lower temperature zones. As used herein, a "high temperature catalyst" is defined to include materials that retain catalytic activity for at least one week at an operating temperature of over 300° C. As used herein, "lower temperature catalyst" includes material that retains catalytic activity for at least one week at an operating temperature below 300° C. This mixed catalyst effect is also achieved by initially distributing catalyst so that a high temperature or reforming catalyst goes into a high temperature zone, and a low temperature or water gas catalyst is initially placed into a lower temperature zone.

Optionally, space is left unfilled between the reaction catalyst coated wall and the membrane. The space between the reaction catalyst coated wall and the membrane optimally ranges from 0.05 to 1.0 inches. More preferably, the space ranges from 0.3 to 0.6 inches.

In another embodiment, the space between the membrane and the catalyst on interior side of the wall is occupied by a flow distributor. A flow distributor is composed of a suitable material illustratively including packing, particulate, mesh wire, wool, granule, pellet, or fluidized catalyst where the reactor is operated in a flow up mode with a proper distribution plate. Illustrative examples of appropriate packing are described in U.S. Pat. No. 5,931,987. A fluidized bed membrane reactor is illustratively described in U.S. Pat. Nos. 5,326,550; 6,183,169; and 6,212,794.

Figure 2:
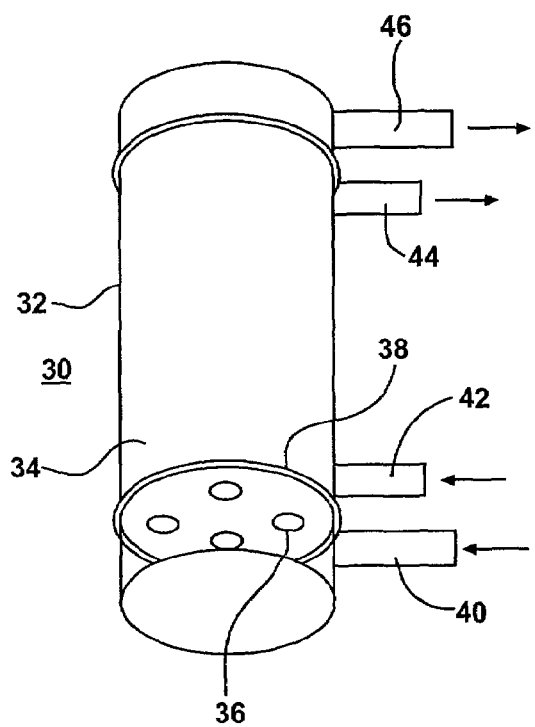
FIG. 2 is a perspective view of a membrane reactor of the present invention having a multichannel monolith.

In a further preferred embodiment, the space between the catalyst on interior side of the wall and the membrane is filled by a multichannel monolith. This configuration extends solid state heat transfer throughout a reactor shown generally at 30 in FIG. 2. FIG. 2 specifically shows a configuration for generation of a syngas or higher hydrocarbon. However, it will be appreciated that the same reactor is configured for generation and collection of other desirable gases such as hydrogen by incorporating an appropriate membrane, an appropriate reaction catalyst and supplying appropriate starting gases as described herein and in U.S. Pat. Nos. 5,888,273 and 5,931,987. The reactor 30 encloses a monolith 34 containing a channel 36 coated with a selective membrane and reaction catalyst. The monolith is sealed against the interior reactor wall using a gasket 38. An air inlet 40 is present on one side of the monolith 34 while a lower hydrocarbon inlet valve 42 is present on an opposing side of the monolith. Exit passages for a desired gas and a waste gas are present at 44 and 46 respectively.

A suitable porous multichannel monolith substrate of this type is generated by techniques known to those skilled in the art. U. Balachandran, *Prepr. Pap.—Am. Chem. Soc., Div. Fuel Chem.*, 42(2), 1997, pp. 591-595. A porous multichannel monolith suitable for inclusion in a reactor of the present invention has channels or pores of diameter ranging from 10 micrometers to 1 millimeter.

A monolith substrate, once cast, is coated with reaction catalyst. The coating of the monolith substrate is achieved by a suitable method illustratively including dip coating. The channels present in the monolith substrate are coated with a selective coating illustratively including palladium, palladium-copper or perovskite oxides and others described in U.S. Pat. No. 5,458,857, so that the channels are gas transport selective. For example, a sintered filter is wash coated such that a layer of alumina ranging from 1 to 100 micrometers in thickness is deposited. A wash coat of a selective membrane material such as palladium is then applied followed by a coating of a reaction catalyst such as Cu or $Ce_2O_3$. The edges of the monolith substrate are then sealed, by methods for example including using a gasket. In addition, monolith substrates as described in U.S. Pat. No. 6,239,064 are operative herein. Appropriate selective coating processes are known for single channel monoliths and catalytically inactive porous substrates. U.S. Pat. No. 5,652,020 and V. Jayaraman and Y. S. Lin, *J Membrane Sci.*, 104, 1995, pp. 251-262.

The monolith substrate is used in autothermal reforming or syngas production where the heat is generated within the channels as well as in endothermic reactions for which external heat is supplied. Where the monolith substrate membrane reactor is used for an endothermic reaction such as that in which hydrogen is produced by methanol reforming or ammonia cracking, good thermal contact between the coated monolith substrate and the wall is preferred for efficient heat transfer. The monolith is attached to the exterior wall of the reactor by any appropriate known method illustratively including using a ceramic paste. In a preferred embodiment, the monolith is attached in a way that allows differential thermal expansion illustratively including use of a ceramic felt gasket. Felt gaskets are well known in the manufacture of automotive catalytic converters.

In a preferred embodiment, where a catalyst coated monolith substrate is used in a membrane reactor of the present invention, the selective membrane layer is coated on the interior surface of the monolith channels.

The reactor of the present invention is oriented in any desired direction including horizontal and vertical.

Combustion Catalyst Coatings

For endothermic reactor applications, a heat source external to the reactor is required to drive the hydrogen-generation reaction. Heat is transferred to the reactor via a liquid or gas. Hot gases produced by combustion of the less desirable gases, or waste products of the reactor, are brought to the external surface of the reactor wall by a suitable method illustratively including free convection and low pressure forced convection. However, the external thermal resistance is typically significant resulting in inefficient heat transfer from the hot gases external to the reactor to the internal reactor. Therefore, in a preferred embodiment, external heat is transferred by coating a combustion catalyst on an exterior wall of a reactor and driving the combustion gases and air over that surface, reducing external gas phase heat transfer resistance. Application techniques for combustion catalysts are known to those skilled in the art of automotive catalytic converters. The reactor wall is formed of a suitable material illustratively including metal such as aluminized stainless steel, stainless steel metal felt or reticulated metal or ceramic or mixtures such as platinum supported on a porous alumina ceramic and one of skill in the art will recognize the appropriate combination of reactor wall material and combustion catalyst material. A combustion catalyst illustratively includes mixed oxides of platinum, palladium, chromium, nickel and rhodium.

Heat Transfer Fin

In a further preferred embodiment heat is transferred from combustion gases to the reactor wall more effectively by increasing the surface area of the exterior surface of the reactor wall. The surface area of the exterior surface is increased in any of a number of ways illustratively including adding an element such as bumps or packing to the exterior surface of the reactor wall or adding extended surface reactor vessel such as a fin tube. A fin tube is oriented radially, axially or helically in direction with respect to the reactor wall. An element of the reactor wall added to increase surface area is optionally coated with combustion catalyst. The element of the reactor wall added to increase surface area is optionally a tubular feed for mixed gases. Also optionally, the tubular feed is coated with reaction catalyst on an interior aspect to function as a pre-reactor.

In another embodiment, a heat transfer element is placed inside the reforming zone providing solid state heat transfer to the reforming catalyst. For example, a fin is used to conduct heat within the reforming zone from a heat conduit along a reactor wall. In a preferred embodiment, exemplified in FIG. 4, a heat conduit runs internal to the reactor and defines a space between the conduit wall and the membrane, the catalytic reaction volume. In the configuration shown, a fin optionally runs radially and axially along the conduit exterior wall thus extending into the catalytic reaction volume. A fin is in contact with the conduit exterior wall and, optionally, in contact with the membrane. The heat transfer element may provide structural support to the membrane. For example, a fin is brazed to the membrane, providing support thereto. Further examples of a heat transfer element illustratively include a wire mesh, particulate, and others as listed herein.

Heat Transfer Arrangement

In a preferred embodiment heat is recovered from the purified gas and recycled for another purpose such as heating the feed. For example, an output tube containing hot purified gas is placed in close proximity to a feed tube containing relatively cooler material. Preferably, the output tube and the feed tube are oriented such that the materials moving through the tubes are flowing in a direction counter to each other. The feed tube may be a tube for delivery of fuel or impure gas such as air, water to a hydrogen generator or delivery of an impure gas, such as hydrogen, to a hydrogen purifier. Preferably, the output tube is in contact with the feed tube and, more preferably, may be brazed to the feed tube. For example, silver braze is used to connect the output tube and the feed tube. In one embodiment, a relatively cool feed is in thermal contact with that portion of the reactor where a water gas reaction takes place.

Flow Disruption

In a further preferred embodiment, a low pressure drop flow disruptor is added to the external gas flow channel of the reactor in order to disrupt a stagnant gas layer next to a reactor wall. An illustrative example of low pressure drop gas flow disruptor is found in home hot water heaters where the designs are typically helical. It will be appreciated by those skilled in the art that other flow disruptor conformations may be desirable depending on the design of a particular reactor of the present invention. For example, the flow disruptor illustratively takes the form of bumps, protrusions, baffles or another shape such as a fin which generates turbulence in a stream of gas contacting the disruptor.

Combination of Heat Transfer Fin and Flow Disruption

Figure 3:
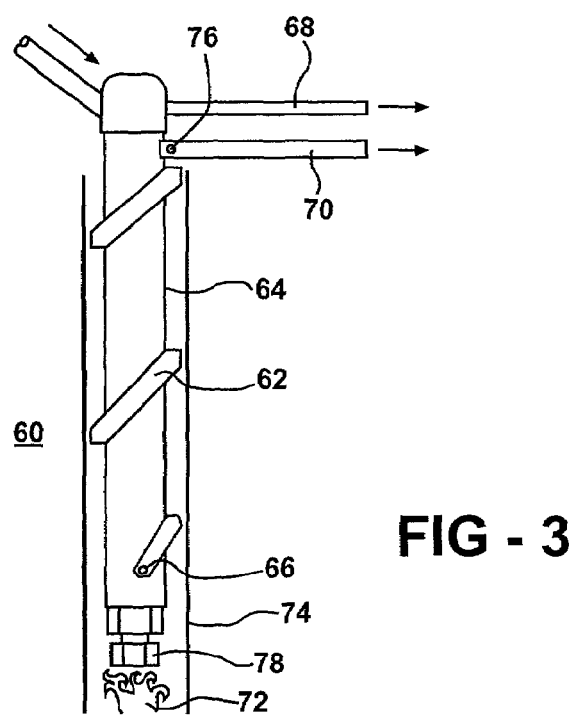
FIG. 3 is a perspective view of a membrane reactor having a coiled feed tube coated with combustion catalyst according to the present invention.

The exterior surface of a reactor is increased as described and combined with flow disrupting means in order to increase heat transfer efficiency. For example, the feed tube is coiled into a helix and brazed to the reactor as shown generally at 60 in FIG. 3. A feed tube for mixed gases 62 is helically coiled around the external wall of the reactor 64 leading into the reactor via a conduit 66. Inside the reactor the mixed gases react to produce a desired gas which passes through a selective membrane and exits through a purified gas outlet 68. Raffinate gas exits through passage 70. A plug 76 is optionally included in the raffinate exit passage where necessary to hold reaction catalyst in place. This is particularly important where the gas flows upward. A fitting 78 is optionally used to add or remove catalyst. Heat is provided to the reactor in part by a heat source 72 and conducted through a chimney 74 enclosing the reactor. This combination provides additional surface area such that the feed tube surface area is almost as large as that of the original reactor, and the flow of combustion gases is disrupted from below at minimal pressure drop.

In a preferred embodiment, pellets of reaction catalyst, G66, are placed within the coiled feed tube to enhance internal heat transfer to the reactor and provide a pre-reactor with a large ratio of surface to volume.

Figure 4:
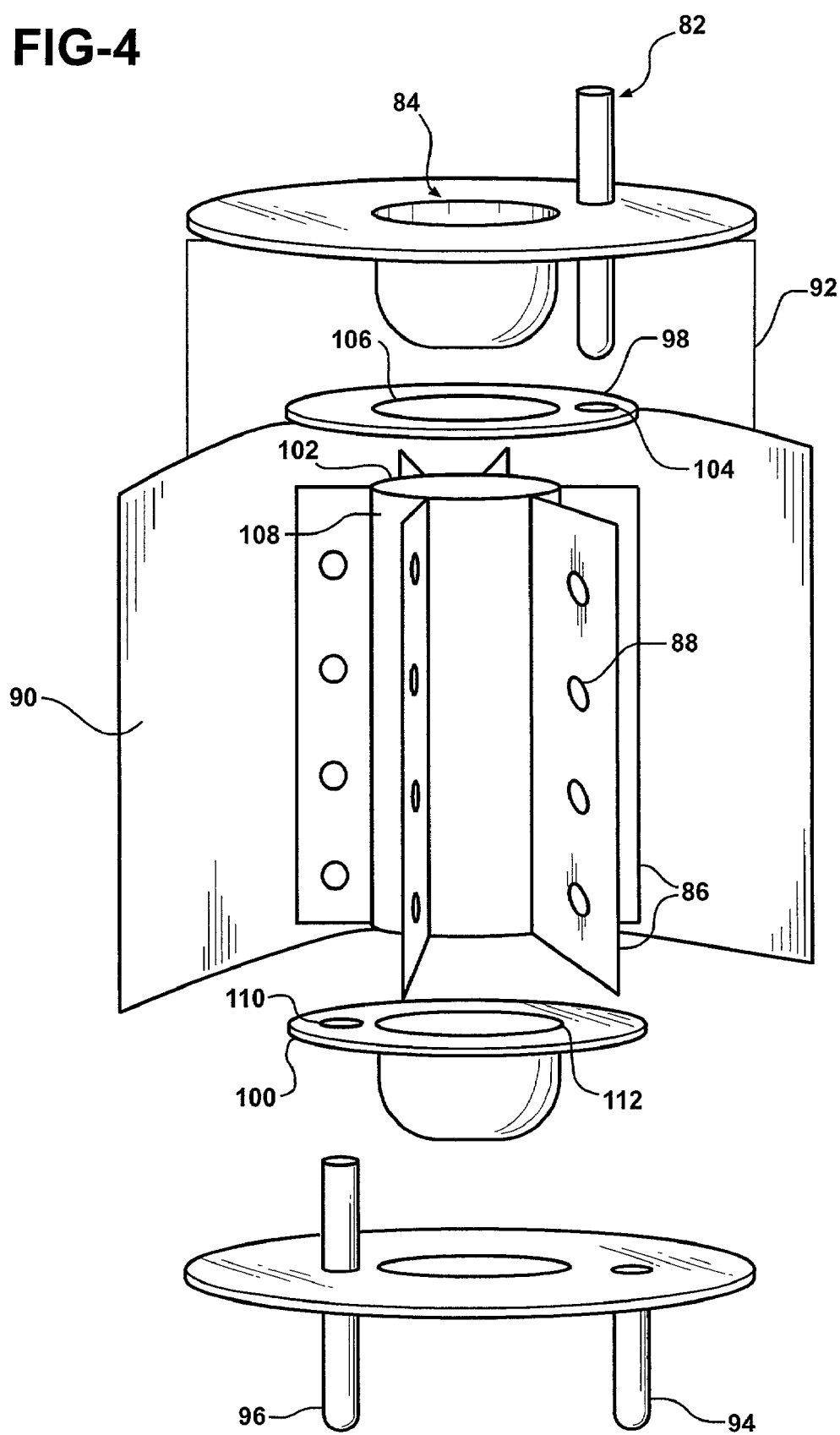
FIG. 4 is an exploded view of a membrane reactor having fins inside the reactor volume.

In an embodiment of the present invention shown in FIG. 4, a feed tube 82 leads into the reactor shown generally at 80. Heat is provided to the reactor in part by a heat source (not shown) and conducted through a heat conduit 84. The heat conduit 84 has an interior side 102 and an exterior side 108. A fin 86 including a passageway 88 is present inside the reactor. A desired gas passes through a selective membrane 90 to a space between the membrane 90 and the outer shell 92. Purified gas exits through an outlet 94. Raffinate gas exits through passage 96. A top plate 98 and a bottom plate 100 are adjacent to the top and bottom of the reactor respectively. The top and bottom plates aid in maintaining pressure within the reformer zone. The top plate has an opening 104 to allow the feed in. The top plate also includes a heat conduit 106. The bottom plate has an aperture 110 for evacuation of raffinate and a heat conduit 112.

A heat transfer element may include a passage, such as that shown at 88, to allow reactant circulation contributing to flow disruption as described above. It is appreciated that curved membranes, dimples, protrusions, packing, mesh wire, wool, granulate, palletized catalyst and fluidized catalyst are operative herein as flow disruptors. A passage has a diameter ranging from 10 micrometers to 1 centimeter. It is appreciated that variations and accessories are readily coupled to the inventive system, illustratively including placement of heat transfer material or combustion catalysts on a heat transfer surface of the reactor, coating reforming catalyst on an interior surface of the reactor body, adding a coiled feed tube, optionally coating a combustion catalyst on the exterior surface of the reactor or feed tube.

Heat Transfer Within Channels

In a preferred embodiment, external heat transfer enhancement occurs through heated channels within the reactor. For example, a hot purge gas, or sweep gas, flows through the same channel as the membrane purified hydrogen and exits with the hydrogen. A still more preferred embodiment includes a straight tube hydrogen permeable membrane with a catheter to allow the purge gas to be introduced and withdrawn. The hydrogen produced flows through a shell provided with an inlet and an outlet and a sweep gas flows through the catheter and annular space of a tube, exiting with the formed hydrogen. This configuration is useful in reactors converting methane or similar light hydrocarbons to benzene and similar higher hydrocarbons. For example, where $6CH_4 \rightarrow benzene + 9H_2$.

It is appreciated that a method of enhancing heat transfer from the outside of the reactor to the inside, such as coating a combustion catalyst on an exterior wall, increasing the exterior wall surface area, disrupting gas flow and directing hot gas into an interior channel, can be combined with another method of enhancing heat transfer or used alone. A method or combination of methods for enhancing heat transfer from the outside of the reactor to the inside is combined with a method for enhanced heat transfer within the reactor such as coating a reaction catalyst on an interior wall of the reactor and placing a catalyst-coated monolith within the reactor.

Sweep Gas Flow to Lower Partial Pressure

A sweep gas is directed through a catheter to the inside of the hydrogen permeable tubes to decrease a partial pressure gradient across the membrane wall. A suitable sweep gas for this application is an inexpensive, readily available, non-toxic gas that is readily separated from the hydrogen, such as steam. A sweep gas is optionally an inert gas such as neon, argon, or nitrogen.

Feed Liquid Compression

In a preferred embodiment, the feed liquid entering an inventive reactor is compressed using pressure energy in the raffinate. Several steam engine type designs are suitable, illustratively including a simplex, duplex, double duplex acting steam pump or donkey. In the present invention, the raffinate gas is expanded against a piston and the liquid feed compressed using the other end of the piston turned smaller than the first piston end, or a second smaller piston attached by a rocker to the first piston. A membrane reactor including a compressor optionally also includes a secondary pressure release for the expanding raffinate gases. In a reactor of the present invention including a compressor, the mixed gas feed is controlled by provided valves. Compressor designs of this sort are known to those skilled in the art of steam locomotion. Suitable designs are shown in the book, "LBSC's shop, shed and road", by Martin Evans (1979), chapter 3. It is to be appreciated that this feed compression is used either in combination with a heat transfer method as disclosed herein, with any other component or process of a membrane reactor as disclosed or alone.

Controlling a Membrane Reactor

A process for controlling a membrane reactor includes regulation of a number of variables of the reactor system including the amount of air sent to the burner, how much raffinate is sent to the burner, how much raffinate is sent to an optional mechanical energy recovery device, the fuel to water feed ratio and the feed pumping rate. Methods for control of any or all of these variables may be included in a process for controlling a membrane reactor as shown in generally in FIG. 5 at 200.

To regulate the amount of air sent to the burner, a source of air 202 may be mixed with raffinate at a point before entering a burner 204 and the amount of air may be controlled by a mix controller 206. The heated exhaust gas 210 which exits the burner 208 is preferably analyzed using an oxygen sensor 212 which provides electronic feedback at 214 to the mix controller in order to adjust the amount of air mixed with raffinate before entering the burner. The range of oxygen to raffinate is in the range of 5:1 to 0.5:1. In a preferred embodiment, the oxygen-raffinate mixture enters the burner at a 1:1 ratio. In general, slightly more oxygen is included to assure complete combustion. With too little air, energy is lost and carbon monoxide pollutants emerge from the reactor. With too much air, thermal energy is dissipated.

Optionally, the amount of raffinate sent to the burner is regulated. Regulation of the amount of raffinate sent to the burner keeps the membrane reactor from over-pressurizing. The present invention optionally uses a combination of a back-pressure regulator 232 and a needle valve 234 in parallel in order to regulate the amount of raffinate sent to the burner. Optionally, a safety pressure vent to air is incorporated (not shown). In an embodiment where the raffinate is sent to a mechanical energy recovery device as described herein, it is preferable that a needle valve should be an adjustable constant flow valve such that flow is relatively insensitive to downstream pressure. Where a mechanical energy recovery device is not used, a common valve or frit may be used rather than a needle valve.

In a further option, the fuel to water feed ratio is controlled to prevent coking among other problems. Preferably, this is done by premixing fuel and water. Optimum mixes are determined by one skilled in the art. For example, an optimal ratio of water to methanol is in the range of 2:1 to 0.5:1 with a preferred ratio of about 1.1:1.

Figure 5:
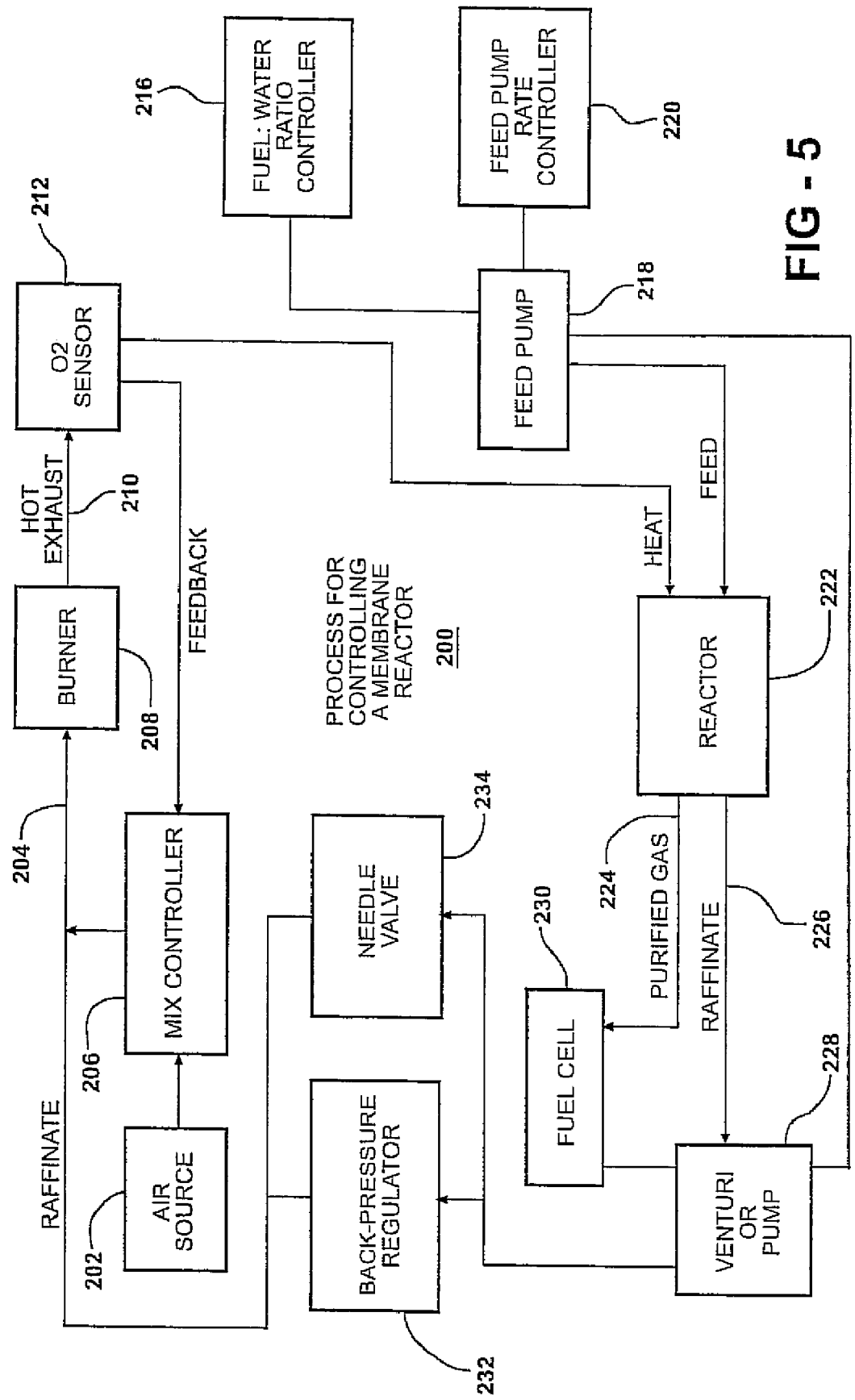
FIG. 5 is a flow diagram illustrating a process for controlling a membrane reactor.

Optionally, the feed pumping rate is adjusted to control hydrogen output. Desirable hydrogen output pressure is typically determined by downstream uses. Feed pump rate control will also be important in controlling reactor temperature. A feed pump rate controller used in a process of the present invention is preferably programmable to coordinate the optimal hydrogen output pressure with the optimal or desired reactor temperature. Referring to FIG. 5, a process for controlling a membrane reactor optionally comprises a fuel-water ratio controller shown at 216 to adjust the fuel-water mix which is fed into the reactor 222 by a feed pump shown at 218. The feed pump rate is controlled by a regulator shown at 220.

Further controls may include a secondary control and a shutoff (not shown). Where the temperature goes too low, as often occurs during startup, raw fuel may be diverted from the reactor to the burner. Alternatively, where the reactor temperature goes too high, as for example during periods where the catalyst or membrane has deactivated, the pump may be shut down. Mechanisms used in combining these two effects in the controller illustratively include fuzzy logic programming.

It is appreciated that any of these methods for controlling a membrane reactor may be used in combination with any other method for controlling a membrane reactor or alone.

Fuel Cell System

A hydrogen consuming fuel cell may be combined with a hydrogen generator or purifier of the present invention as a fuel cell system. In a preferred embodiment of the present invention, an inventive reactor system allows a fuel cell to operate at sub-atmospheric pressure. Operation of a fuel cell at sub-atmospheric pressures is more efficient and allows an operator to use a greater proportion of the hydrogen generated as desired. A preferred method of optimizing a reactor system operation is to create a vacuum to draw a small flow of low pressure bleed from the fuel cell. In a preferred embodiment of the present invention, a vacuum is created by exhausting the raffinate to the burner section through a venturi or pump 228. By doing this, a vacuum is created in the throat of the venturi, the vacuum can be used to draw a small flow of low pressure bleed from the fuel cell at sub-atmospheric pressure. The resultant mixture of hydrogen, impurities, and raffinate is then communicated to the burner, e.g. to provide heat for the membrane reactor.

Referring to FIG. 5, raffinate gases exit the reactor as shown at 226 and are optionally fed through a venturi shown at 228. Purified hydrogen or a purified desired gas exits the reactor as shown at 224 and to an exemplary usage device shown herein as fuel cell 230. The raffinate gas pressure may be regulated optionally by a back-pressure regulator 232 or a needle valve 234, preferably both in parallel. It is typically advantageous that a needle valve should be set so that most of the flow exits through the needle valve, even at maximum output.

It is appreciated that this method of increasing the efficiency of the inventive reactor system may be used in combination with a heat transfer method, a method of feed liquid compression, with any other component or process of a membrane reactor as disclosed or alone.

Any patents or publications mentioned in this specification are indicative of the levels of those skilled in the art to which the invention pertains. These patents and publications are herein incorporated by reference to the same extent as if each individual publication was specifically and individually indicated to be incorporated by reference.

One skilled in the art will readily appreciate that the present invention is well adapted to carry out the objects and obtain the ends and advantages mentioned, as well as those inherent therein. The present methods, procedures, treatments, molecules, and specific compounds described herein are presently representative of preferred embodiments, are exemplary, and are not intended as limitations on the scope of the invention. Changes therein and other uses will occur to those skilled in the art which are encompassed within the spirit of the invention as defined by the scope of the claims.

The invention claimed is:

1. A gas purification system comprising:
a reactor operating above room temperature having a reactor volume and a reactor wall, the reactor wall having an interior side and an exterior side, and defining a communicating portal therebetween for a mixed gas flow;
a gas selective membrane within the reactor volume, said gas membrane in contact with the mixed gas flow and selectively passing a constituent gas of the mixed gas flow therethrough, such that a raffinate of the mixed gas flow is retained in contact with said membrane;

a reaction catalyst coating in contact with the exterior side of the reactor wall;

an outlet channel for removing said raffinate from contact with said selective membrane;

a raffinate compressor disposed in fluid communication with said outlet channel expanding said raffinate; and a passageway for the removal of the constituent gas from the interior of said reactor.

2. The gas purification system of claim 1 wherein the raftinate compressor is a venturi.

3. The gas purification system of claim 1 further comprising a fuel cell powered by the constituent gas.

4. The gas purification system of claim 1 wherein the passageway is brazed to the feed conduit.

5. The gas purification system of claim 1 having at least one component coupled thereto, said component being selected from a group consisting of: a raffinate burner, a mixed gas flow feed pump, a raffinate back pressure controller, and an oxygen sensor.

6. The system of claim 1 further comprising a raffinate burner coupled to said outlet.

7. A gas purification system comprising:

a feed pump;

a reactor-purifier system for generating purified hydrogen by transmission through a hydrogen selective membrane and a raffinate stream from a feed, the feed provided by said feed pump;

a burner for combusting the raffinate produced by said reactor-purifier system to yield a heated exhaust gas, heat from said burner being used to heat said reactor-purifier system;

a back pressure regulator intennediate between said reactor and said burner and regulating flow of said raffinate therebetween;

a needle valve in parallel with said back pressure regulator; and a source of air mixed with said raffinate before combustion in said burner.

8. The gas purification system of claim 7 further comprising feed liquid compression means to convey the mixed gas flow through the portal into said reactor.

9. The system of claim 7 further comprising a fuel cell receiving the hydrogen from said reactor.

10. A feed pump controller operating on the system of claim 7, such that feed rate is adjusted in response to hydrogen output pressure.

11. The system of claim 7 further comprising a means for combining additional fuel with the rafinate flow to the burner; additional fuel being used for startup and, to a lesser extent, for ordinary operation.

12. The system of claim 11 further comprising a fuel flow controller which adjusts the rate of additional fuel flow in response to the temperature of said reactor-purifier system.

13. The system of claim 7 wherein said reactor-purifier system comprises a separate reactor and a purifier system.

14. A gas purification system comprising:

a feed pump;

a reactor-purifier system for generating purified hydrogen by transmission through a hydrogen selective membrane, and a raffinate stream from a feed, the feed provided by said feed pump, said reactor-purifier system comprising:

a reactor having a reactor volume and a reactor wall, the reactor wall having an interior side and an exterior side, and defining a communicating portal therebetween for a feed;

a heat conduit within the reactor volume having a conduit wall, the conduit wall having an interior side and an exterior side, and defining a channel therethrough for passing a heated material through the reactor volume;

a reaction catalyst coating in contact with the exterior side of the conduit wall;

a burner for combusting the raffinate produced by said reactor-purifier system to yield a heated exhaust gas, heat from said burner being used to heat said reactor-purifier system;

a back pressure regulator intermediate between said reactor and said burner and regulating flow of said raffinate therebetween;

a source of air mixed with said raffinate before combustion in said burner; and a mix controller adjusting the ratio of said raffinate in said air provided to said burner.

15. The system of claim 14 further comprising an oxygen sensor to adjust the amount of said raffinate relative to the amount of said source of air delivered to said burner.

16. The system of claim 14 further comprising a fuel cell receiving the hydrogen from said reactor.

17. A feed pump controller operating on The system of claim 14, such that feed rate is adjusted in response to hydrogen output pressure.

18. The system of claim 14 further comprising a means for combining additional fuel with the raffinate flow to the burner; additional fuel being used for startup and, to a lesser extent, for ordinary operation.

19. A membrane reactor gas purification system comprising:

a reactor having a reactor volume and a reactor wall, the reactor wall having an interior side and an exterior side, and defining a communicating portal therebetween for a mixed gas flow;

a heat conduit within the reactor volume having a conduit wall, the conduit wall having an interior side and an exterior side, and defining a channel therethrough for passing a heated material through the reactor volume;

a reaction catalyst coating in contact with the exterior side of the conduit wall;

a gas selective membrane within the reactor volume disposed between the reactor wall and the conduit wall, said gas membrane in contact with the mixed gas flow and selectively passing a constituent gas of the mixed gas flow therethrough, such that a raffinate of the mixed gas flow is retained in contact with said membrane;

an outlet channel for removing said raffinate from contact with said selective membrane; and a passageway for the removal of the constituent gas from the interior of said reactor.

20. The gas purification system of claim 19 wherein said heat conduit has flowing therein a sweep gas.

* * * * *